United States Patent [19]

Krofta

[11] Patent Number: 4,626,345

[45] Date of Patent: Dec. 2, 1986

[54] APPARATUS FOR CLARIFICATION OF WATER

[75] Inventor: Milos Krofta, Lenox, Mass.

[73] Assignee: Lenox Institute for Research, Inc., Lenox, Mass.

[21] Appl. No.: 646,789

[22] Filed: Sep. 4, 1984

[51] Int. Cl.$^4$ .............................................. B01D 21/01
[52] U.S. Cl. .................................. 210/104; 210/147; 210/221.2; 210/275; 210/530
[58] Field of Search .................... 210/704, 221.2, 275, 210/530, 520, 525, 145, 147, 148, 104, 107, 138

[56] References Cited

U.S. PATENT DOCUMENTS

| | | | |
|---|---|---|---|
| 3,171,804 | 3/1965 | Rice | 210/53 |
| 3,307,701 | 3/1967 | Krofta | 210/221.2 |
| 3,820,659 | 6/1974 | Parlette | 210/221.2 |
| 4,022,696 | 5/1977 | Krofta | 210/520 |
| 4,303,517 | 12/1981 | Love et al. | 210/208 |
| 4,377,485 | 3/1983 | Krofta | 210/704 X |

OTHER PUBLICATIONS van Vuuren et al, "Treatment of Water from Eutrophied Impoundments", paper presented at TWSA Specialized Conference on Eutrophication & Water Supply, Vienna, Austria, Oct. 1981.

*Primary Examiner*—Tom Wyse
*Attorney, Agent, or Firm*—Sidney Greenberg

[57] ABSTRACT

Apparatus for removing suspended particles from water comprises outer and inner concentrically arranged tanks and a carriage arranged on top of the outer tank for movement around the same. Unclarified water is introduced into the inner tank along with flocculating material for combining with the suspended particles in the water, and the mixture passes from the inner to the outer tank. Gaseous bubbles are introduced into the mixture for attaching to the flocculated suspended particles and floating them to the surface of the water in the outer tank, forming a sludge layer thereon. A scoop device mounted on the carriage removes the sludge for discharge from the apparatus. A plurality of filter beds are arranged near the bottom of the outer tank for removing the remaining precipitated flocs to complete the clarification of the water for discharge, and suction apparatus is arranged above the filter beds for cleaning the same. Timer means control the positioning of the suction apparatus over predetermined filter beds and the cleaning operation thereof.

13 Claims, 2 Drawing Figures

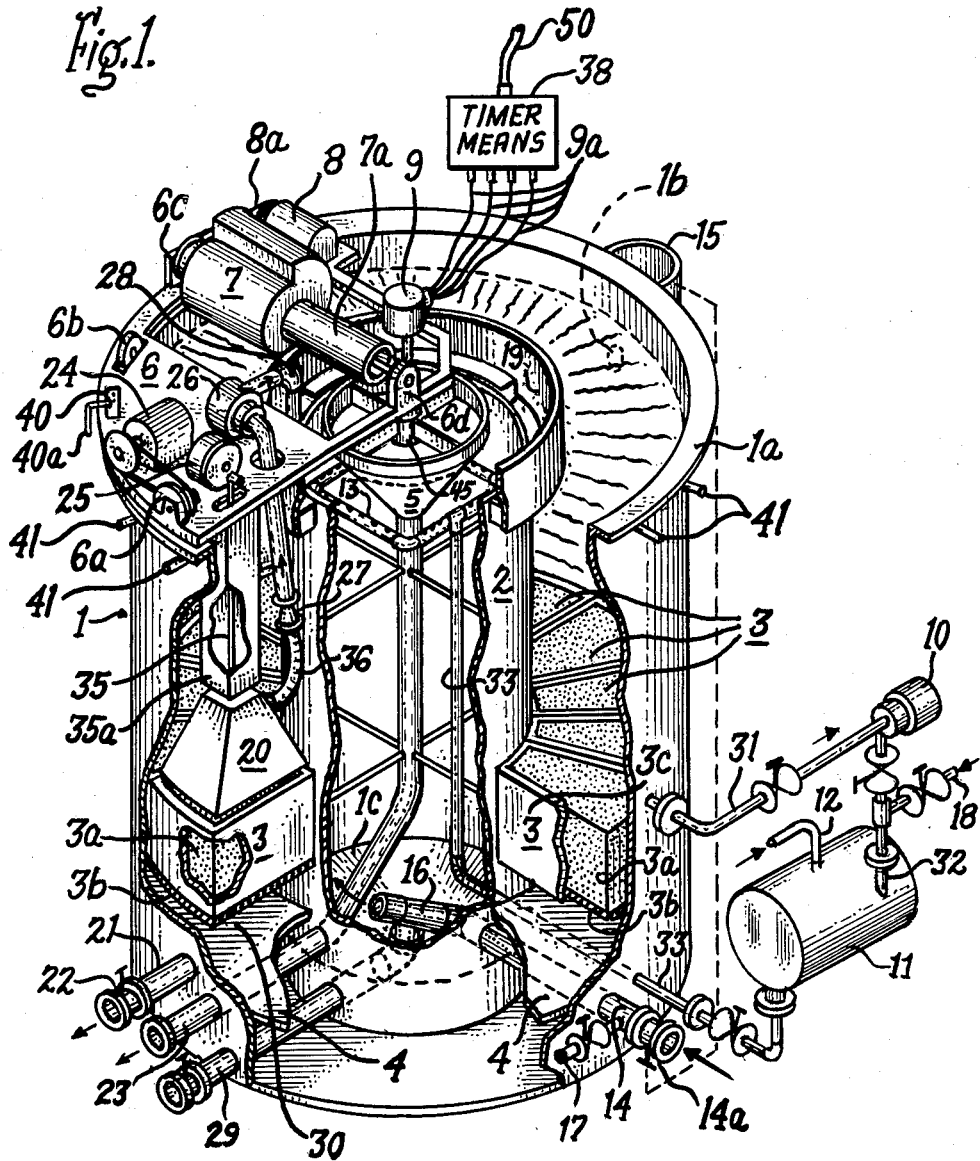

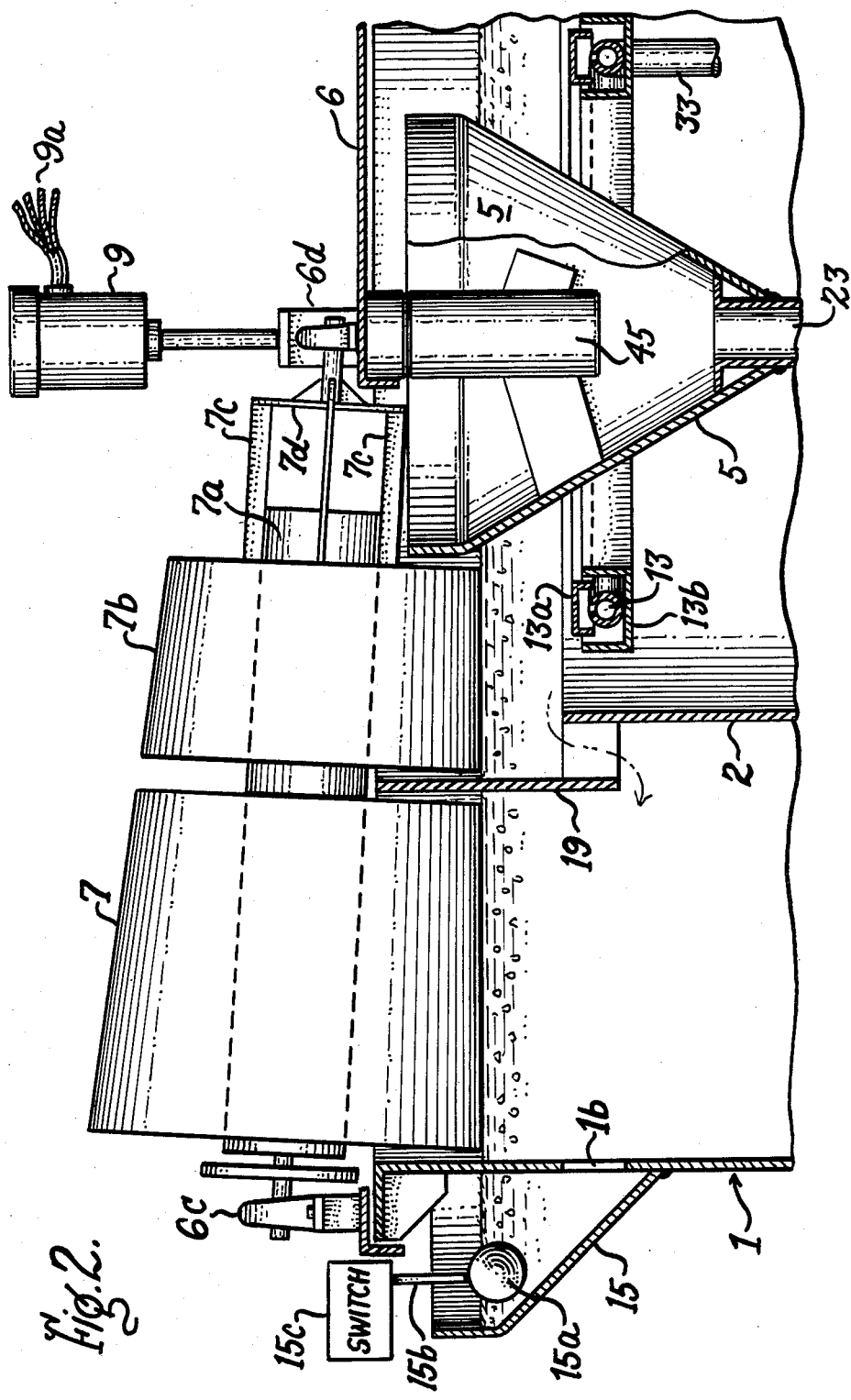

APPARATUS FOR CLARIFICATION OF WATER

The present invention relates to apparatus or treatment of liquids to remove suspended particles therefrom, and more particularly concerns apparatus for clarifying and purifying water.

The present invention is related to the invention disclosed in Krofta U.S. Pat. No. 4,377,485 issued Mar. 22, 1983, but incorporates a number of modifications of the patented apparatus to provide a smaller and more compact unit, as well as other advantages.

Reference is also made to co-pending Krofta application Ser. No. 625,089, filed June 27, 1984 which concerns relates subject matter.

It is an object of the invention to provide a novel water treatment apparatus of the above type to clarify water for drinking or other municipal or industrial purposes.

It is a particular object of the invention to provide a novel water treatment apparatus of the above type using flocculation, flotation and filtration processes.

It is another object of the invention to provide water treatment apparatus of the above type having a plurality of filter beds for filtering settleable solids in the unclarified water and improved equipment for efficiently cleaning the filter beds.

A further object of the invention is to provide water treatment apparatus of the above type having improved arrangements to provide efficient flocculation and flotation of the suspended particles in the water.

Still another object of the invention is to provide water treatment apparatus of the above type which is relatively simple and compact in structure and is relatively low in cost.

Other objects and advantages will become apparent from the following description and the appended claims.

With the above objects in view, the invention in one of its aspects relates to apparatus for treatment of unclarified water comprising, in combination, an outer tank, an inner tank arranged within the outer tank, a carriage arranged on top of the outer tank and movable about the vertical axis thereof, conduit means for introducing unclarified water into the inner tank, supply means connected to the conduit means for adding flocculating material to the unclarified water, whereby the flocculating material is mixed with the unclarified water in the inner tank, the top of the inner tank being below the top of the outer tank, whereby the unclarified water with contaminant-attached flocculating material therein overflows from the inner tank into the outer tank means for introducing into the upper portion of the inner tank gaseous material dissolved in water for attaching to the flocculated contaminant particles in the mixture and floating the same in the outer tank, means on the carriage for removing the sludge formed by the flocculated particles on the surface of the water in the outer tank, filter means at the bottom portion of the outer tank for removing downwardly flowing flocculated material, and discharge means for removing the thus clarified water.

The invention will be better understood from the following description taken in conjunction with the accompanying drawings, in which:

FIG. 1 is a view in perspective, partly broken away, of an embodiment of the water treatment apparatus of the invention: and FIG. 2 is a fragmentary cross-sectional view in enlarged scale of the upper portion of the apparatus.

Referring now to the drawings, and particularly to FIG. 1, the water purifying apparatus there illustrated comprises an outer cylindrical tank 1 in which is concentrically arranged an inner cylindrical tank 2, also referred to herein as a flocculation tank, resting on the supporting surface on which outer tank 1 also rests. The top of inner tank 2 is below the top of outer tank 1 (e.g., about 6 inches), and surrounding the inner tank top is circular deflector ring 19 which is secured thereto and spaced outwardly thereof to provide openings between the tanks to allow water overflowing inner tank 2 to spill over into outer tank 1 (see FIG. 2). Deflector 19 serves to break the force of the water overflowing tank 2, thereby reducing the turbulence of the water and enhancing the formation of the sludge layer at the top of tank 1.

Movable carriage 6 is mounted on the top of tank 1 for circular movement thereon, having rollers 6a, 6b at its outer margin resting on flanged rim 1a of tank 1 for rolling thereon, and being pivotally mounted at its inner portion on central bearing 45 secured to stationary funnel 5 as shown.

Motor 24 mounted on carriage 6 drives roller 6a via a belt for rotating the carriage about its central bearing 45 and the vertical axis of tank 1.

Spiral scoop 7 is mounted on carriage 6 extending through an opening therein so as to be in contact with the surface of the water in outer tank 1 on which floated sludge collects as explained more fully below. Scoop 7 is rotatably mounted on a shaft attached at one end to a support 6c on carriage 6 and at its other end to hub 6d of the carriage, and is rotated via belt 8a by variable speed motor 8 mounted on carriage 6 adjacent thereto.

Electrical power obtained through cable 50 for operating motors 24 and 8, as well as other motors described below, enters through electrical rotary contact 9, electrical conductors 9a being connected between timer device 38 and contact 9 for supplying power to the various motors via connecting conductors (not shown) between contact 9 and the respective motors.

Centrally mounted above inner tank 2 is funnel 5 arranged to receive sludge collected by scoop 7 and discharged from the latter through tube 7a. Pipe 23, suitably secured to inner tank 2, is connected at its top to funnel 5 and extends downwardly and outwardly through tanks 1 and 2 and serves to discharge the collected sludge from the system. As seen in FIG. 2, an auxiliary scoop 7b, omitted from FIG. 1 for the sake of clarity, is mounted on tube 7a adjacent main scoop 7 for removing sludge which may accumulate on the liquid surface in inner tank 2, tube 7a having openings within the respective scoops for receiving sludge collected thereby for discharge into funnel 5, and tube 7a passing between four spaced support strips 7c secured to supporting disc 7d.

A plurality of filter bed compartments 3 suspended between tanks 1 and 2 are circumferentially arranged in the lower portion of the annular space therebetween above the bottom 4 of that space. Each filter bed compartment 3 is filled with a layer of sand 3a contained within walls 3c and supported by a fine screen 3b, the annular chamber 30 thus provided below the filter compartments constituting a chamber for receiving the water filtered by the filter bed array. Extending into chamber 30 is discharge pipe 21 for removal of the clarified water from the system, valve 22 serving to control the rate of discharge.

Inlet pipe 14 which passes through outer tank 1 and into the interior of inner flocculation tank 2 supplies raw unclarified water to the inner tank and comprises a nozzle portion 16 arranged in the inner tank at an angle to the tank axis to cause agitation and spiralling of the raw water in the latter tank to enhance the flocculation process therein. Connected into inlet pipe 14 is pipe 17 through which a flocculating agent, typically a solution of alum (aluminum sulfate), is introduced into the raw water passing into flocculation tank 2. As well understood in the art and as disclosed in the aforementioned Krofta patent, the flocculating agent reacts with dissolved chemicals in the raw water to form minute flocculates or "flocs" to which the contaminant particles in the water become attached, so that they can be readily removed.

Outlet pipe 31 communicating with the interior of tank 1 above filter beds 3 conducts a portion of the pre-clarified water out of tank 1 to pressure pump 10 which in turn feeds the water through conduit 32 into air-dissolving tank 11. Compressed air is supplied to tank 11 through pipe 12 for mixing with the water supplied through conduit 32.

Connected to conduit 32 is pipe 18 through which a solution of a polyelectrolyte, may be added to the water passing into tank 11. The polyelectrolyte, when mixed with the alum-treated water in flocculation tank 2, enhances the coagulation process initiated by the alum, and may be any of a number of known materials for this purpose.

The pressurized water in tank 11 containing dissolved air and the polyelectrolyte is transmitted to inner tank 2 by pipe 33 and enters rectangular distribution pipe 13 which has perforations therein to discharge the water into tank 2. Distribution pipe 13 is arranged in the upper central portion of tank 2 so as to be located just below the surface of the flocculated water in tank 2 prior to its overflowing into outer tank 1, as described above. Minute air bubbles formed in the water discharged through the perforations in pipe 13 become attached to the particle-attached flocs in the water as it overflows into tank 1, and subsequently float to the surface of the flocculated water in the latter tank, forming a sludge layer thereon.

As seen in FIG. 2, upper and lower deflectors 13a, 13b are arranged above and below perforated pipe 13 to break the force of the water discharged from the latter pipe, so as to produce a more uniform flow of the water without turbulence.

Container 15 mounted on the outside of tank 1 at its upper portion (see FIG. 2) communicates with the interior of the tank through opening 1b below the water surface therein and contains a float 15a to monitor the liquid level in the tank. Float 15a is connected by rod 15b to switch device 15c for actuating the switch, the latter operating inlet regulating valve 14a in pipe 14 (see FIG. 1) for the purpose of keeping the liquid level in tank 1 constant.

The bottom wall 1c of inner tank 2, which is conical converging downwardly, has connected centrally thereof drain pipe 29 which passes outwardly of outer tank 1 and serves to discharge heavy settleable solids, such as sand, which may accumulate at the bottom of the inner tank.

For the purpose of cleaning the surfaces of filter beds 3, suction hopper 20 is suspended from carriage 6 by rod 35 which is connected to motor 25 mounted on the carriage, the rod being enclosed by housing 35a attached to the carriage. The interior of hopper 20 is connected by pipe 36 to suction pump 26 which is also mounted on carriage 6 and to which is connected discharge pipe 28 leading at its outlet end to the interior of flocculation tank 2. Motor 25 serves to lower hopper 20 onto each filter bed 3 and raise it therefrom, as explained more fully below. The size and shape of hopper 20 at its bottom are such that the hopper in its lowered position snugly fits the top of the respective sand beds. The movement of hopper 20 relative to fixed housing 35a is enabled by the use of flexible material such as plastic for pipe 36, the hopper movement being relatively limited, e.g., about 1 inch.

In accordance with a feature of the invention, the rotation and stopping of carriage 6 is controlled, by means described below, so that suction hopper 20 is lowered onto a particular filter bed after skipping a predetermined number of filter beds during each revolution around the tank. For this purpose, the number of filter beds 3 provided in tank 1 is a prime number, e.g., 19, 23, 29, 31, 37, and in a typical case 31 beds are employed. In this way, the backwashing process is uniformly extended over the complete filtering time and uniformly cleans the filter beds.

Rotation of carriage 6 is controlled by microswitch 40 mounted on the carriage and having an actuating arm 40a projecting outwardly and downwardly from the carriage. Switch 40 is connected to motor 24 and is operable to turn the latter on and off. Attached to the wall of tank 1 are a plurality of circumferentially spaced rods or studs 41 arranged to be contacted by switch arm 40a as the carriage rotates. The number and spacing of studs 41 correspond to those of filter beds 3, and the operation of motor 24 is so controlled by switch 40 and timer device 38 that suction hopper 20 is lowered only onto predetermined filter beds during each complete rotation of carriage 6, as described above. Timer device 38 includes a presettable variable impulse switch of known type to effect such control.

In the operation of the water purifying apparatus, raw water to be clarified is supplied through pipe 14 and pre-mixed with a flocculating agent such as alum introduced through pipe 17, and the mixture enters flocculation tank 2 through nozzle 16. In tank 2, flocculates (flocs) are formed as the water moves spirally upward in the tank, and intimately and thoroughly mixes with the flocs, enhancing the attachment of contaminant particles in the water to the flocs. In the meantime, the mixture of partially clarified water with dissolved air and polyelectrolyte flocculation material entering tank 2 through supply pipe 33 is discharged through perforated pipe 13 at the top of the tank, where the floc with entrapped particles attaches to the air bubbles generated by such discharge of the water from pipe 13. This mixture then overflows into flotation tank 1, and the particle-attached flocs rise with the air bubbles to the surface of the liquid in tank 1, forming a floating layer of sludge thereon. As carriage 6 revolves, scoop 7 collects the sludge as it rotates, dumping the sludge into funnel 5, from which it is discharged through pipe 23 for suitable disposal.

Most of the contaminant particles in the unclarified water are removed by the described flotation and sludge removal process. As unclarified water is continually supplied to tank 2, the water in tank 1 with remaining floc material and attached contaminants is drawn downwardly therein as clarified water drains out through pipe 21 and passes through the array of sand filter beds 3 into annular chamber 30.

As sludge material accumulates on the surface of the sand filters, the liquid flow through the sand decreases. To maintain the proper flow through the system, the sand in each filter bed is cleaned periodically. This is achieved, as previously described, by lowering the suction hopper 20 at predetermined intervals onto each filter bed, after movement of carriage 6 stops. Operation of suction pump 26 begins to draw water out of the filter bed while lifting and fluidizing the sand therein. The dirty backwash water thus drawn out is discharged through pipeline 28 into flocculation tank 2. After a predetermined time, e.g., 20 seconds, suction pump 26 stops, and any return flow in pipe 36 is prevented by check valve 27. After a further predetermined time, e.g., 10 seconds, the sand settles under hopper 20, the hopper is lifted by motor 25, and carriage 6, driven by motor 24, resumes movement until it stops over another sand bed after skipping a predetermined number of filter beds.

In a typical installation, outer tank 1 is about 5 feet in diameter and 6 feet high, inner tank 2 is about 2½ feet in diameter and 5½ feet high, and the flow rate is about 47 gallons per minute.

There is thus provided by the invention a water treatment apparatus which efficiently clarifies and purifies raw or contaminated water containing suspended particles, bacteria, and other undesirable organic and inorganic matter, such as characterize various water sources of low quality including lakes, ponds, streams, septic tanks and the like, the apparatus occupying a relatively small space and being relatively low in cost.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Apparatus for treatment of unclarified water comprising, in combination, an outer tank, an inner tank arranged within said outer tank, a carriage arranged on top of said outer tank and movable about the vertical axis thereof, conduit means opening into said inner tank for introducing unclarified water into said inner tank, supply means connected to said conduit means for adding flocculating material to the unclarified water, whereby the flocculating material is mixed with the unclarified water in said inner tank, the top of said inner tank being below the top of said outer tank, whereby the unclarified water with contaminant-attached flocculating material therein overflows from said inner tank into said outer tank, first pipe means extending upwardly in said inner tank and having gas diffuser means connected thereto at its upper end for introducing into the upper portion of said inner tank gaseous material dissolved in water for attaching to the flocculated contaminant particles in the mixture and floating the same in said outer tank, means on said carriage for removing the sludge formed by the flocculated particles on the surface of the water in said outer tank, second pipe means extending upwardly in said inner tank and having funnel means at its upper end for receiving sludge from said sludge removing means and discharging the same, filter means at the bottom portion of said outer tank for removing downwardly flowing flocculated material, the walls of said inner and outer tanks defining an annular space therebetween, said filter means comprising a plurality of filter beds arranged in said annular space, said filter beds comprising porous material having surfaces on which said downwardly flowing flocculated material is deposited, means for removing the thus deposited material, and discharge means for removing the thus clarified water.

2. Apparatus as defined in claim 1, sand removing means comprising suction means carried by said carriage for movement therewith around said annular space above said filter beds for removing said deposited material from the surface thereof, and second conduit means connected to said suction means for discharging the thus removed material into said inner tank.

3. Apparatus as defined in claim 2, including means for lowering said suction means onto individual filter beds, and control means for selectively lowering said suction means onto an individual filter bed after passing a predetermined number of filter beds.

4. Apparatus as defined in claim 3, the total number of said filter beds being a prime number.

5. Apparatus as defined in claim 2, said filter beds comprising circumferentially arranged contiguous compartments having screen means at their bottom defining an undivided annular chamber between the bottom of said compartments and the bottom of said annular space, whereby clarified water in said annular chamber may be drawn upwardly through the respective individual filter beds by said suction means.

6. Apparatus as defined in claim 1, said sludge removing means comprising rotatable spiral scoop means having discharge tube means extending over said funnel means.

7. Apparatus as defined in claim 6, and auxiliary spiral scoop means adjacent said first mentioned scoop means and rotatable therewith for removing sludge from the surface of water in said inner tank and discharging the same into said funnel means.

8. Apparatus as defined in claim 1, and deflector means at the top of said inner tank encircling the same and defining openings therebetween, whereby the water overflowing said inner tank is deflected downwardly through said openings into said outer tank.

9. Apparatus as defined in claim 1, said conduit means having an outlet portion in said inner tank arranged at an angle to the axis of said inner tank for imparting an upward spiral flow therein of unclarified water.

10. Apparatus as defined in claim 1, said means for introducing water with dissolved gaseous material comprising an exterior pipe extending into said outer tank, pump means connected to said exterior pipe, an air dissolving container connected to said pump means, compressed air supply means connected to said container, and inlet pipe means passing into said inner tank from said container, whereby pre-clarified water drawn from said outer tank through said exterior pipe is pumped into said container and the mixture thereof with dissolved air is transmitted by said inlet pipe means into said inner tank.

11. Apparatus as defined in claim 1, said inner tank having a downwardly converging bottom wall, and drain means connected to the bottom of said inner tank for removing settleable solids therefrom.

12. Apparatus as defined in claim 1, and means for sensing and controlling the level of water in said outer tank.

13. Apparatus for treatment of unclarified water comprising, in combination, an outer tank, an inner tank arranged within said outer tank, a carriage arranged on top of said outer tank and movable about the vertical axis thereof, conduit means opening into said inner tank for introducing unclarified water into said inner tank, supply means connected to said conduit means for adding flocculating material to the unclarified water, whereby the flocculating material is mixed with the unclarified water in said inner tank, the top of said inner tank being below the top of said outer tank, whereby the unclarified water with contaminant-attached flocculating material therein overflows from said inner tank into said outer tank, means for introducing into the upper portion of said inner tank gaseous material dissolved in water for attaching to the flocculated contaminant particles in the mixture and floating the same in said outer tank, means on said carriage for removing the sludge formed by the flocculated particles on the surface of the water in said outer tank, filter means at the bottom portion of said outer tank for removing downwardly flowing flocculated material, and discharge means for removing the thus clarified water, the walls of said inner and outer tanks defining an annular space therebetween, said filter means comprising a plurality of filter beds arranged in said annular space, said filter beds comprising porous material having surfaces on which said downwardly flowing flocculated material is deposited, and means for removing the thus deposited material, said removing means comprising suction means carried by said carriage for movement therewith around said annular space above said filter beds for removing said deposited material from the surface thereof, and second conduit means connected to said suction means for discharging the thus removed material into said inner tank, including means for lowering said suction means onto individual filter beds, and control means for selectively lowering said suctin means onto an individual filter bed after passing a predetermined number of filter beds, said control means comprising a plurality of projecting means spaced around said outer tank, switch means carried by said carriage adapted to sequentially engage said plurality of projecting means during rotation of said carriage, and electrical means connected to said switch means and operable to selectively start and stop the rotation of said carriage.

* * * * *